April 21, 1959     G. W. GILBERT     2,883,615
DOUBLE LEVEL THRESHOLD DETECTOR
Filed Oct. 10, 1957     2 Sheets-Sheet 1
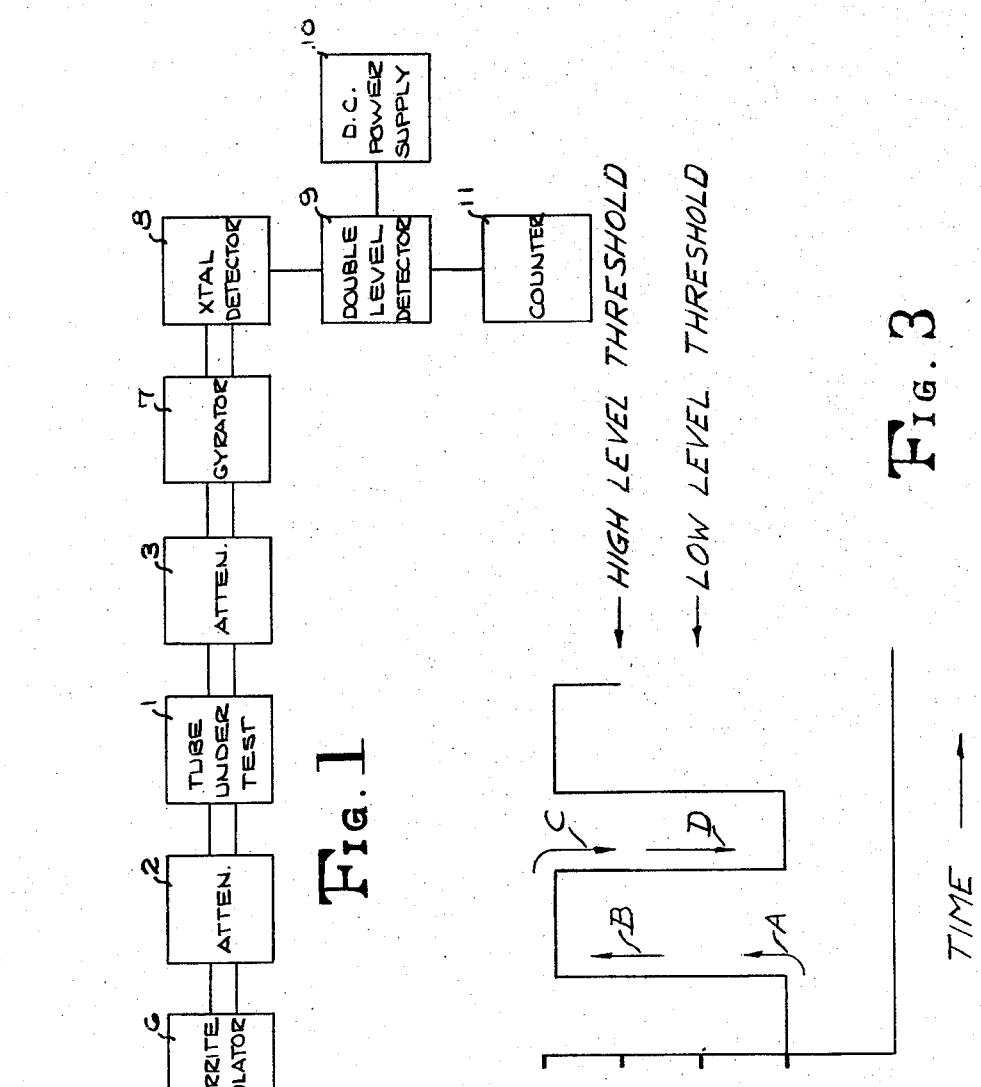
INVENTOR
GORDON W. GILBERT
BY
ATTORNEY

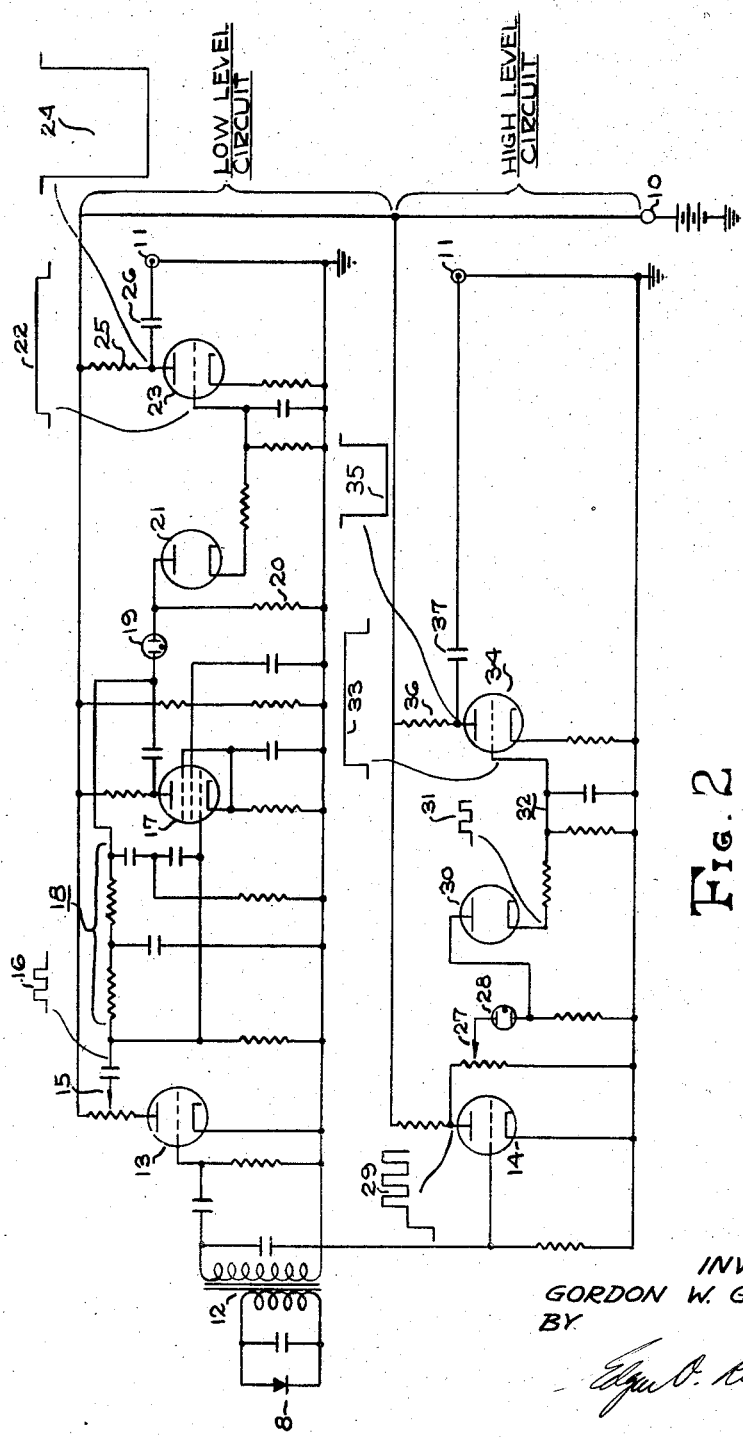

United States Patent Office 2,883,615
Patented Apr. 21, 1959

2,883,615

DOUBLE LEVEL THRESHOLD DETECTOR

Gordon W. Gilbert, Beverly, Mass., assignor to Bomac Laboratories Inc., Beverly, Mass., a corporation of Massachusetts Application October 10, 1957, Serial No. 689,297

2 Claims. (Cl. 324—26)

The present invention relates to electronic circuits and in particular to a detector circuit for differentiating between varying amplitude modulated pulses and creating counting pulses to evaluate performance of a microwave frequency device.

A combination switching and attenuating tube, referred to as a shutter tube is of recent origin in the microwave art and is described in detail in U.S. Patent No. 2,734,171 issued on February 7, 1956, to H. Heins. Generally such devices incorporate electromechanical means for introducing and removing a metallic element in the gap between spaced discharge electrodes to thereby attenuate microwave signal energy in conventional radar systems. Since the attenuating element must effectively block pulsed energy signals at microwave frequencies when employed as protective devices for sensitive receivers, reliability is extremely important. It is, therefore, desirable to provide a reliability test for shutter devices to assure their efficient performance in radar system usage.

The prerequisite for the reliability measurement devices is the detection and recording of performance data in both the open and closed shutter condition where the rapid time interval for a complete cycle prevents the use of conventional mechanical counting devices. The present invention has for its primary object the provision of an electronic detecting circuit incorporating a threshold switch which facilitates differentiating and counting of varying amplitude modulated pulses.

A further object is the provision of a reliability test circuit for combination switching and attenuating devices to compile data on performance at distinct levels of attenuation.

The objects enumerated may be attained briefly by means of a detection and amplification circuit wherein pulses either at high level with the shutter open or at low level with the shutter closed are differentiated and related to a threshold amplitude to trigger separate counting pulses. Prior to the conception of the invention, these functions could only be achieved by the use of sensitive relays which give rise to maintenance problems.

In the circuit disclosed herein at 1000 cycle square wave modulated signal from a klystron oscillator after propagation through the device under test is detected by means of two biased branched circuits each designed to respond to pulses of predetermined amplitude. By reason of the fact that the radar frequency level of a signal attenuated by the closed shutter is well below a —50 db point and the open position results in a value in the vicinity of —5 db, it is possible to energize two individual counters to indicate when a pulse has been lower than or in excess of the preselected threshold values. The low level detecting and counting circuit is adjusted by means of a potentiometer to a threshold value of —40 db and a neon lamp will cause this circuit to pass counting pulses when this value is attained. The other circuit, however, is calibrated to pass pulses of greater amplitude or —20 db and record pulses passing through this value. Hence, there is incorporated in a unitary circuit a means for detecting and counting amplitude modulated pulses at two varying levels with assured accuracy and dependability.

Other objects, features and advantages will be evident after consideration of the following detailed description and reference to the appended drawings in which:

Fig. 1 is a schematic diagram of an illustrative test circuit employed with the embodiment of the invention;

Fig. 2 is a circuit diagram of the embodiment of invention; and

Fig. 3 is a graph illustrating an amplitude modulated pulse to explain the operation of the circuit of the invention.

Referring now to the drawings Fig. 1 illustrates a suggested test circuit incorporating the embodiment of the invention. The device under test comprises a switching-attenuator tube 1 constructed in accordance with the aforementioned patent. Variable attenuators 2 and 3 may be mounted on either side of the tube to provide suitable padding to regulate the threshold values necessary for the function of the detector of the invention. The overall system may, therefore, be adjusted to a preselected point. The main source of modulated radio frequency energy is a local oscillator of the klystron type 4 having a power supply 5 connected thereto. A conventional ferromagnetic isolation device 6 is provided after the klystron tube to control any reflected standing waves which may alter the oscillator frequency. A gyrator 7 is connected between attenuator 3 and a conventional crystal detector 8 to further attenuate high level radio frequency energy propagated when the shutter tube 1 is in the open position. The embodiment of the invention 9 is connected to crystal detector 8 with a D.C. voltage supply 10 and an electronic counter 11 in turn connected to the embodiment.

Referring to Fig. 2 the double level threshold detector has been designed to produce a counting pulse only from modulated pulses of increasing amplitude. The signal originating from klystron 4 is a 1000 cycle square wave radio frequency pulse which is first detected by a conventional crystal device 8 from whence the pulse is passed by way of a 1:10 step-up transformer 12 to first amplifier tubes 13 and 14 heading each branch circuit. Tube 13 and associated components constitute the low level branch to detect pulses at the —40 db threshold and the tube 14 heads the high level circuit with a —20 db threshold.

Low level branch

The circuit is headed by amplifier tube 13 supplied by a D.C. voltage supply of approximately 300 volts for maximum sensitivity. The threshold switch of this branch comprises a potentiometer 15 connected to the plate circuit of tube 13 which in turn leads to a sharp cut-off pentode tube 17. A selected filter 18 is connected across tube 17. The pulsed A.C. signal as shown at 16 is fed through the filter 18 to give sharp attenuation at only a selected frequency of 1000 cycles to thereby avoid amplification of hum. With the filter and sharp cut-off pentode a short circuit will appear between the plate and control grid at all frequencies except the selected 1000 cycle. To complete the switch a neon glow discharge lamp 19 is connected to the plate of pentode 17 and will be energized by an amplified signal. Upon ignition of lamp 19 a voltage is developed across resistor 20 and the signal is impressed on diode 21 where it is rectified and reduced to a positive rectangular D.C. voltage pulse 22. This voltage is applied to the grid of saturable amplifier 23 with a resultant large negative voltage pulse 24 across plate load resistor 25 which is in turn fed through condenser 26 to electronic counter 11. These pulses may be recorded on a bank of discharge tubes adapted to total the pulses as an indication of the "closed" condition of the device under test.

*High level circuit*

Amplifier tube 14 similarly supplied by the 300 volt D.C. supply heads this branch of the overall circuit. The threshold switch in this instance comprises potentiometer 27 connected between the plate and ground to act as a D.C. voltage divider. Neon glow discharge lamp 28 connected directly to potentiometer 27, therefore operates primarily on the 1000 cycle modulation added to the D.C. base set by 27, as shown by pulse 29. Diode 30 similar to its counterpart 21 in the low-level branch rectifies the selected amplitude pulses allowing only positive pulses 31 to appear between the cathode and ground. An RC network 32 removes the 1000 cycle modulation with a resultant rectangular pulse 33 applied to the grid of a saturable amplifier 34. Tube 34 responds similarly to tube 23 in the low-level branch and negative pulse 35 passes to the plate load resistor 36 to be in turn fed through condenser 37 to the appropriate lead of counter 11. A separate bank of discharge tubes will record total pulses received in the open condition of the device under test.

Referring now to Fig. 3 the application for which the circuit was evolved will be described. The radio frequency level of a signal reaching crystal detector 8 normally varies from below −40 db to well above −20 db. Hence as the pulse amplitude increases from −50 db through the −40 db preselected threshold value as indicated by arrow A, the low level circuit is energized by neon lamp 19 and a count is registered. As the pulse level continues to increase through the −20 db point indicated by arrow B to say −10 db a count will be registered due to energizing of neon lamp 28. Hence a count on the low level counter indicates that the level has been lower than −40 db and a count on the high level counter indicates the level has increased through the −20 db level. The registration of the two counters should show equal counts to indicate perfect functioning of the device under test.

A feature of the circuit disclosed is that neon lamps 19 and 28 will remain illuminated until the pulse level falls below the threshold value. Hence as the level decreases as indicated by arrow C, lamp 28 is extinguished and when it passes through the level as indicated by arrow D, lamp 19 becomes extinguished. There is thus disclosed a circuit for recording pulses only of increasing amplitude and the need for sensitive and switching relays is eliminated. The embodiment will also provide greater reliability in testing the illustrative devices.

What is claimed is:

1. In combination with a microwave test apparatus a circuit for differentiating and counting amplitude modulated pulses passing through preselected threshold values comprising a crystal diode detector, a step-up transformer, a low-level and a high-level branch circuit each connected for maximum sensitivity to a D.C. voltage supply, each of said branch circuits having a first amplifier tube, a diode rectifier, a saturable amplifier tube with the grid connected to said diode rectifier, an electronic counter to record in separate banks of discharge tubes the total negative pulses resulting from each branch circuit, a threshold switch for the low-level branch connected between the first amplifier tube and the diode rectifier, said low-level switch comprising a potentiometer tapped to the plate circuit of the first amplifier tube to pass voltage pulses at the first preselected amplitude, a sharp cut-off pentode tube, a selective filter connected across the pentode tube to thereby pass only amplified pulses at one selected frequency, a neon glow discharge lamp connected to the plate of said pentode to be energized only by selected amplified pulses, a threshold switch for said high-level branch connected between the first amplifier tube and the diode rectifier, said high-level switch comprising a potentiometer connected between the plate of the first amplifier tube and ground to pass voltage pulses at the second preselected amplitude and a neon glow discharge lamp connected to said potentiometer to be energized only by the second selected amplified pulses.

2. The combination as claimed in claim 1 in which said threshold switches are energized only by pulses of increasing amplitude.

References Cited in the file of this patent

UNITED STATES PATENTS

| | | |
|---|---|---|
| 2,638,273 | Jensen et al. | May 12, 1953 |
| 2,689,299 | Anderson | Sept. 14, 1954 |
| 2,789,267 | Beal et al. | Apr. 16, 1957 |
| 2,790,142 | Guthrie | Apr. 23, 1957 |